(12) United States Patent
Balogh

(10) Patent No.: US 9,031,788 B2
(45) Date of Patent: May 12, 2015

(54) NAVIGATION SYSTEM APPLICATION FOR MOBILE DEVICE

(71) Applicant: NNG KFT., Budapest (HU)

(72) Inventor: Peter Balogh, Budapest (HU)

(73) Assignee: NNG KFT., Budapest (HU)

( * ) Notice: Subject to any disclaimer, the term of this patent is extended or adjusted under 35 U.S.C. 154(b) by 0 days.

(21) Appl. No.: 14/109,752

(22) Filed: Dec. 17, 2013

(65) Prior Publication Data

US 2014/0180587 A1 Jun. 26, 2014

Related U.S. Application Data

(63) Continuation of application No. 13/725,101, filed on Dec. 21, 2012, now Pat. No. 8,762,059.

(51) Int. Cl.
| | |
|---|---|
| G01C 21/00 | (2006.01) |
| H04L 29/08 | (2006.01) |
| G01C 21/32 | (2006.01) |
| H04W 4/00 | (2009.01) |
| G08G 1/0968 | (2006.01) |

(52) U.S. Cl.
CPC ............. *G01C 21/00* (2013.01); *H04L 67/12* (2013.01); *G01C 21/32* (2013.01); *H04W 4/00* (2013.01); *G08G 1/096883* (2013.01)

(58) Field of Classification Search
CPC ....... H04L 67/18; H04L 1/1809; H04W 4/02; H04W 84/10; G01S 19/19
USPC .................... 701/533; 455/404.2, 428, 456.1; 345/633
See application file for complete search history.

(56) References Cited

U.S. PATENT DOCUMENTS

| | | | | |
|---|---|---|---|---|
| 7,020,468 | B2 * | 3/2006 | Squibbs et al. | 455/445 |
| 7,136,645 | B2 * | 11/2006 | Hanson et al. | 455/435.1 |
| 7,725,114 | B2 * | 5/2010 | Feher | 455/456.1 |
| 7,957,895 | B2 | 6/2011 | Haase | |
| 8,068,982 | B2 | 11/2011 | Takada | |
| 8,072,354 | B2 | 12/2011 | Jeong | |
| 8,583,356 | B2 | 11/2013 | Thomassen | |
| 8,762,059 | B1 * | 6/2014 | Balogh | 701/533 |
| 2008/0228393 | A1 | 9/2008 | Geelen | |
| 2008/0249710 | A1 | 10/2008 | Takada | |
| 2009/0177378 | A1 | 7/2009 | Kamalski et al. | |
| 2009/0177386 | A1 | 7/2009 | Haase | |
| 2009/0177396 | A1 | 7/2009 | Thomassen | |
| 2009/0177677 | A1 | 7/2009 | Mikusiak | |

(Continued)

OTHER PUBLICATIONS

U.S. Appl. No. 13/725,101; Office Action mailed Dec. 13, 2013.

*Primary Examiner* — McDieunel Marc
(74) *Attorney, Agent, or Firm* — Lewis Roca Rothgerber LLP

(57) ABSTRACT

A mobile application on a mobile device communicates with a head-unit of a navigation system. The mobile application may retrieve data such as map data, user input data, and other data and communicate the updates to the head unit. By retrieving map data through the mobile application, the head unit may be updated much easier than systems of the prior art. The data may be retrieved through cellular networks, Wi-Fi networks, or other networks which accessible to a user and compatible with the mobile device. Updates may be stored in the mobile device and automatically uploaded to the navigation system head unit when the user is in the vicinity of the head unit. The mobile application may establish a logical connection with one or more head units. The logical connection bounds the mobile application to the head unit and allows for data sharing and synchronization.

16 Claims, 7 Drawing Sheets

(56) References Cited

U.S. PATENT DOCUMENTS

| | | |
|---|---|---|
| 2010/0088029 A1 | 4/2010 | Hu et al. |
| 2012/0242687 A1 | 9/2012 | Choi |
| 2014/0180585 A1* | 6/2014 | Balogh .................. 701/533 |

* cited by examiner

NAVIGATION SYSTEM APPLICATION FOR MOBILE DEVICE

CROSS-REFERENCE TO RELATED APPLICATIONS

The present application is a continuation and claims the priority benefit of U.S. patent application Ser. No. 13/725,101 filed Dec. 21, 2012, the disclosure of which is incorporated herein by reference.

BACKGROUND

Portable navigation devices are very popular with present-day travelers. The navigation devices typically include a head unit which sits atop a dashboard or within a front travel area of an automobile. The head unit receives geographical location information, such as global positioning system (GPS) coordinates, matches the coordinates to map data, and may provide a graphical indication to a driver of an automobile as to where the car currently is and is heading.

Though useful, most navigational systems can be burdensome to update and expand. For example, to receive updated map data, many navigational systems must be brought to a service provider. Some navigation systems include compact discs or other computer-readable media for updating or providing additional map data. These methods of updating maps are inconvenient for travelers and affect the expandability of these systems.

There is a need for making navigation systems expandable and more flexible in a more user-friendly way.

SUMMARY

The present technology, roughly described, provides a mobile application for execution on a mobile device and able to communicate with a head-unit of a navigation system. The mobile application may retrieve data such as map data, user input data, and other data and communicate the updates to the head unit. By retrieving map data through the mobile application, the head unit may be updated much easier than systems of the prior art. The data may be retrieved through cellular networks, Wi-Fi networks, or other networks which accessible to a user and compatible with the mobile device. Once retrieved by the mobile application, the updates may be stored in the mobile device and automatically uploaded to the navigation system head unit when the user is in the vicinity of the head unit.

The mobile application may establish a logical connection with one or more head units. The logical connection bounds the mobile application to the head unit and allows for data sharing and synchronization. Once connected in the logical connection (i.e., "bound"), the mobile application receives the maps of the connected head unit and may transmit data to the head unit.

DETAILED DESCRIPTION

The present technology, roughly described, provides a mobile application for execution on a mobile device and able to communicate with a head-unit of a navigation system. The mobile application may retrieve data such as map data, user input data, and other data and communicate the updates to the head unit. By retrieving map data through the mobile application, the head unit may be updated much easier than systems of the prior art. The data may be retrieved through cellular networks, Wi-Fi networks, or other networks which accessible to a user and compatible with the mobile device. Once retrieved by the mobile application, the updates may be stored in the mobile device and automatically uploaded to the navigation system head unit when the user is in the vicinity of the head unit.

The mobile application may establish a logical connection with one or more head units. The logical connection bounds the mobile application to the head unit and allows for data sharing and synchronization. The logical connection may last a specified period of time, such as for example three months. To form the logical connection, the head unit must have a current license to receive a navigation service, a maximum number of logical connections must not be reached by the mobile application, and other factors may be satisfied.

Once connected in the logical connection (i.e., "bound"), the mobile application receives the maps of the connected head unit and may transmit data to the head unit. The transmitted data may include new map data, user input data, and other data related to additional services provided by the current navigation system.

Figure 1:
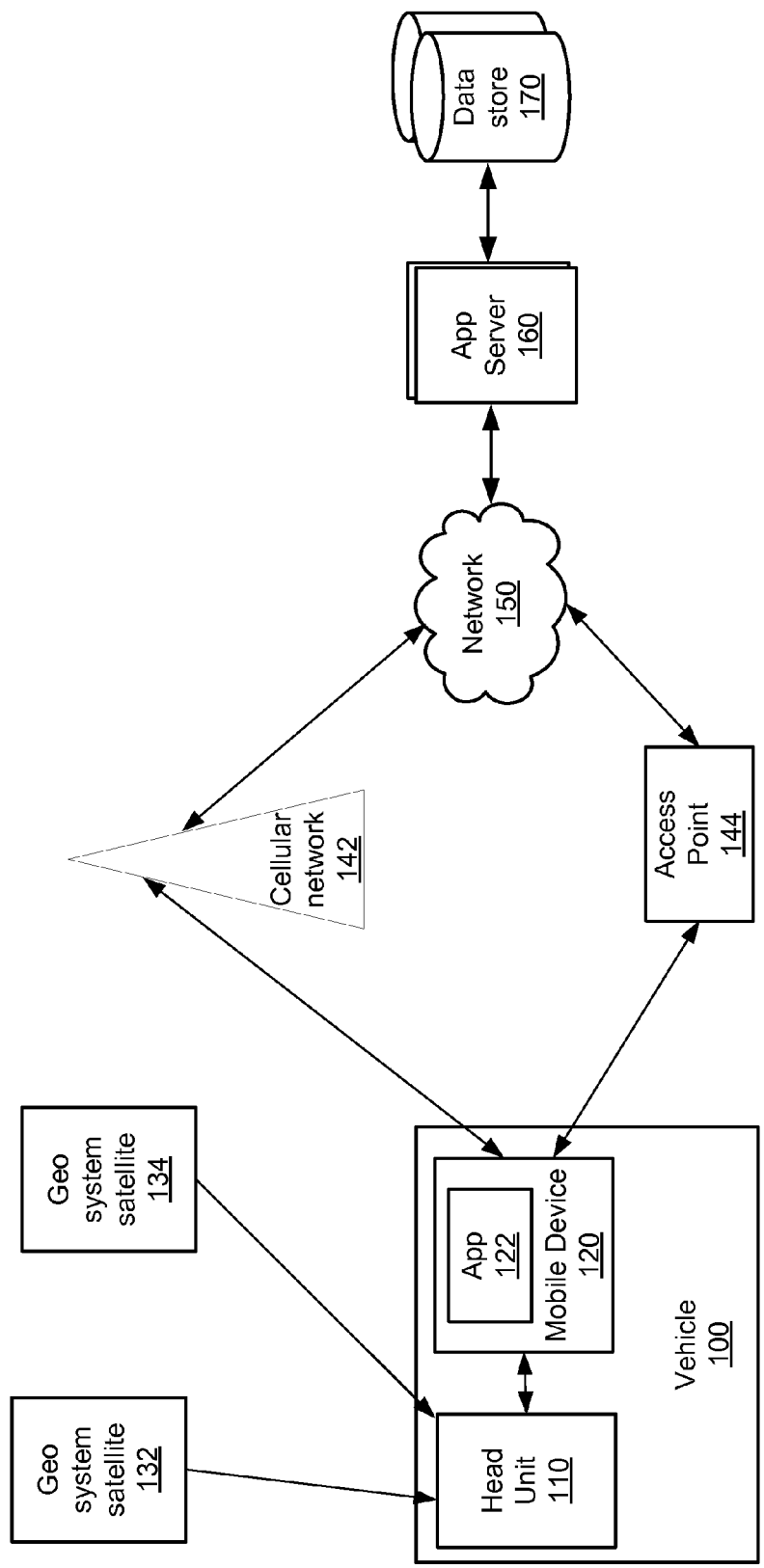
FIG. 1 is a block diagram of a system for providing a navigation service.

FIG. 1 is a block diagram of a system for providing a navigation service. The system of FIG. 1 includes vehicle 100, head unit 110, mobile device 120, and satellites 132 and 134. Head unit 110 may communicate with satellites 132 and 134 to determine a geographic coordinates of head unit 110 within vehicle 100. Head unit 110 may communicate with Global Positioning System (GPS) satellites to determine geographic coordinates. Head unit 110 may store mapping data used to graphically provide the current location of vehicle 100 based on the data received from satellites 132 and 134.

Mobile device 122 may be associated with a user, such as a driver of vehicle 100, and may be implemented as a smart phone, tablet computer, or other mobile device. Mobile application 122 may be stored and executed on mobile device 120. Mobile application 122 may be retrieved from a mobile application store, such as a network service providing applications compatible with the iOS system by Apple Computer, the Android mobile device operating system, or other operating system The system of FIG. 1 also includes cellular network 142, a wireless access point 144, network 150, application server 160 and data store 170. Cellular network 142 may communicate voice information and other data to mobile device 120 and network 150. The cellular network 142 may be provided by a cellular service provider.

Access point 144 may include one or more devices that operate to provide a wireless signal in communication with mobile device 120 and network 150. Access point 144 may include one or more of a modem, router, or other device. Network 150 may include a local network, private network, public network, the Internet, an intranet, a wide area network, a local area network, and any combination of these networks.

Network 150 may communicate with cellular network 142, access points 144 and application server 160.

Application server 160 may include one or more computing devices configured to communicate with network 150. Application server 160 may provide a network service providing, for example, mapping data and other data to mobile application 122. Application server 160 may communicate with application 122 via cellular network 142 or access point 144. Data store 170 may communicate with application server 160 and may include map data and additional data. Application server 160 may retrieve and update the data stored on data store 170 and communicate the data to the mobile application 122.

Figure 2:
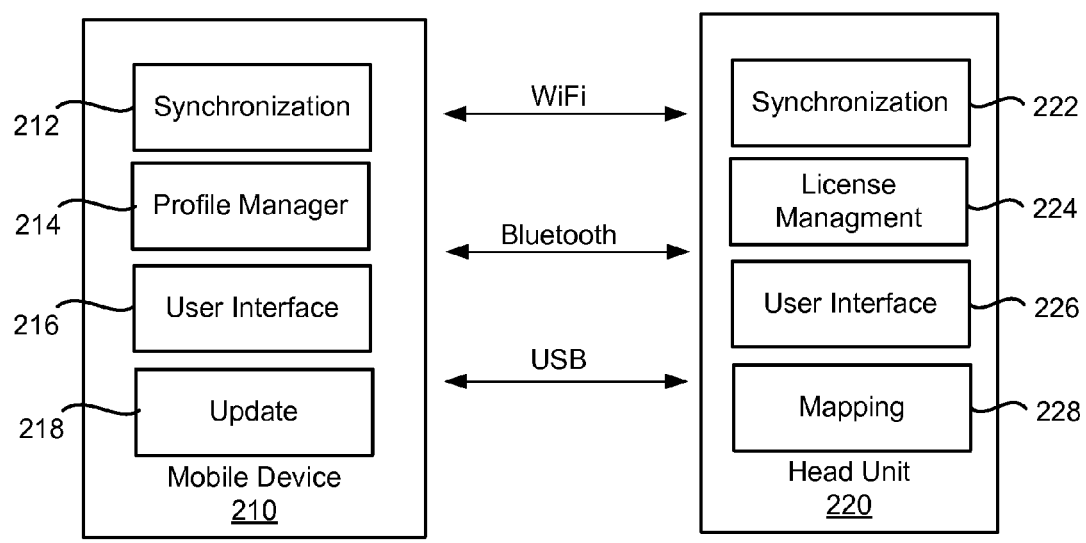
FIG. 2 is a block diagram of a mobile device and a head unit.

FIG. 2 is a block diagram of a mobile device and a head unit. Mobile device 210 and head unit 220 may communicate via a Wi-Fi signal, a Bluetooth signal, or a wired connection such as a USB connection.

The mobile device 210 may include modules stored in memory and executable by a processor to perform different tasks and functions. These modules may include a synchronization module 212, profile manager 214, user interface module 216, and update module 218. The synchronization module may manage synchronizations with other devices, including head unit 220, for user data associated with the mobile device 210. Profile module 214 may manage user profiles. In some embodiments, a mobile device may connect with and maintain a profile for each of up to three head units at a time. The profile manager 214 tracks these "connections" and profiles to keep them up to date, and other profile management. User interface module 216 provides and updates interfaces to a user of mobile device 210 as well as manages connections with head unit 220. Update manager 218 may manage updating of map data and other data in communication with head unit 220 from the mobile device.

Head unit 220 may communicate with mobile device 210 and includes software modules stored in head unit memory and executed by one or more head unit processors. The modules may include a synchronization module 222, license module 224, user interface 226 and mapping module 228. The user interface module 226 and synchronization module 222 may operate similarly to the corresponding modules of mobile device 210 discussed above. Licensing module 224 may store and manager a user's license of the navigational service received through head unit 220 for a user. Mapping module may manage map display and retrieval.

Figure 3:
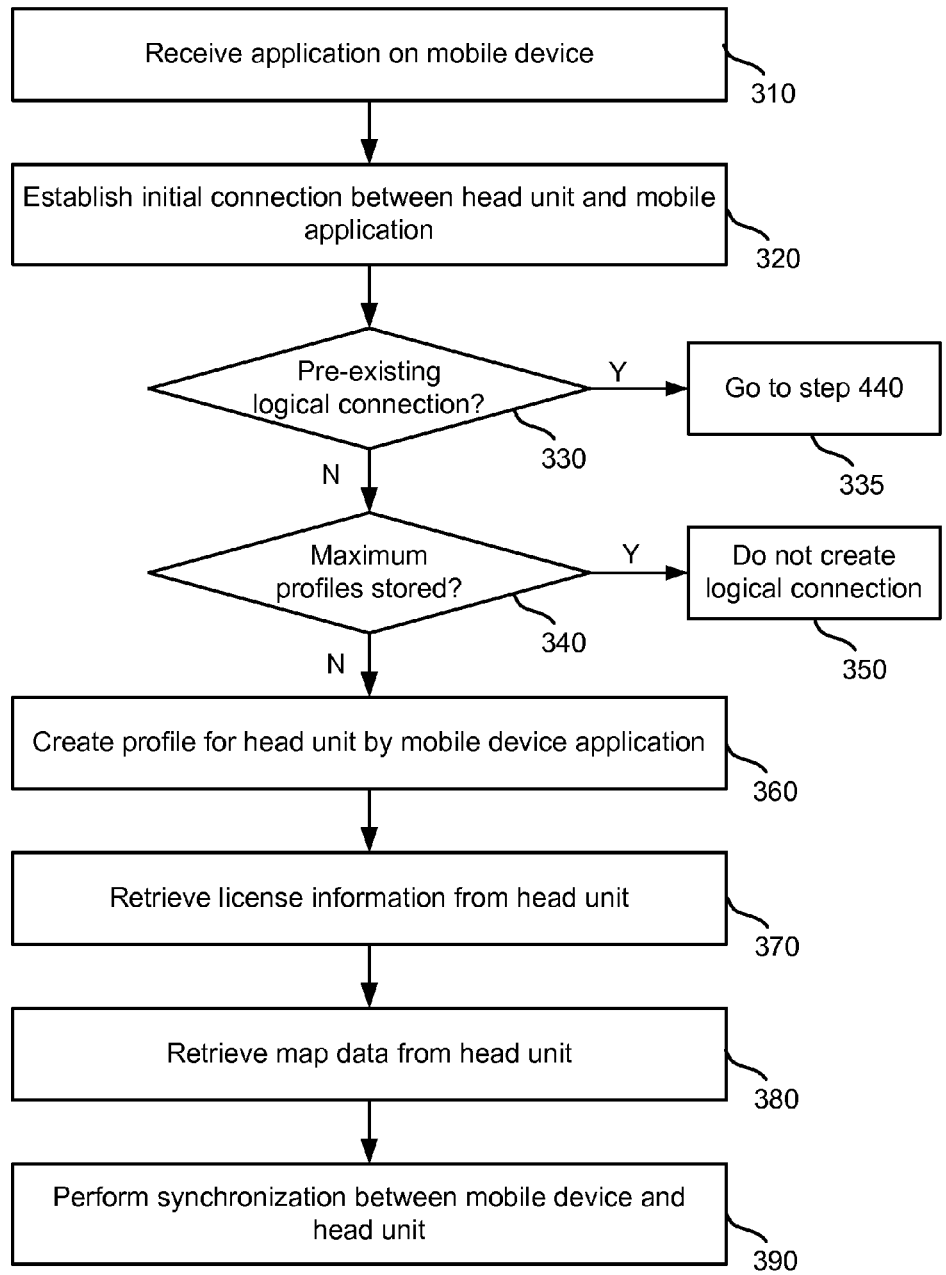
FIG. 3 is a method of mobile device operation with a mobile application.

FIG. 3 is a method of mobile device operation with a mobile application. The method of FIG. 3 may be implemented on mobile device 110 of FIG. 1. First, an application is received on a mobile device at step 310. The application may be a mobile application compatible with an Apple's iOS operating system, an Android operating system for a mobile device, or other application. The application may be received via a mobile application store over the Internet or in some other manner. Once received, the mobile application may be stored and executed on the mobile device. In some embodiments, a user may provide information to the mobile application upon executing the application, such as a username, setting of initial parameters (i.e., language), and so forth.

A connection may be established between the mobile device and a head unit at step 320. The mobile application may initiate the connection between the mobile device and head unit. The connection may be established wirelessly or via a wire connection between the two devices, for example as illustrated in FIG. 2.

A determination is made as to whether the installed mobile application and head unit have an existing logical connection at step 330. A logical connection is formed between a mobile application and a head unit when a user establishes a data connection between the two devices and provides input to effectively "bind" the application and head unit. Bounding the mobile application and the head unit serves to provide access to head unit maps on the mobile device, provide data updates and uploads to the head unit by the mobile device as driven by the mobile application, synchronization of selected data between the mobile device and the head unit, and other features. The mobile application may maintain a number of logical connections at any particular time. In some embodiments, a mobile device may maintain up to three logical connections simultaneously.

Returning to FIG. 3, if the mobile application and head unit do have a pre-existing logical connection, operation of the mobile device continues as discussed below with respect to step 440 of the method of FIG. 4. If the mobile application and head unit do not have an existing logical connection, a determination is made at step 340 as to whether the mobile device already has the maximum number of active head unit profiles. If the mobile device has the maximum head unit profiles, no additional profiles or connections may be established at step 350. In some embodiments, a notification may be provided to a user through the mobile device and/or head unit that the logical connection cannot be established. In some embodiments, the mobile application and head unit may still perform minimal communications, but map data is not transferred between the application and head unit.

If the mobile device and head unit do not have an existing logical connection and the mobile device has fewer than the maximum number of unit profiles, a profile may be created for the head unit at step 360. The created profile may include a head unit identifier, the vehicle type, the date of profile creation, and other data provided by the head unit.

License information may be retrieved from the head unit in step 370. The license information may include data access parameters, the geographical location limits of the head unit (e.g., the head unit may receive updates in a particular state or country only), and other data regarding the use of the geographical location navigation service for the head unit.

Map data from the head unit may then be transmitted to the mobile device application at step 380. Current maps used by and stored in the head unit may be downloaded to the mobile application. The application may use the maps, such as for example for trip planning, while the head unit is licensed by the user.

A synchronization operation may be performed to sync user data between the mobile device and the head unit at step 390. The synchronization may sync user data which the user wishes to store on the head unit, and vice versa. Examples of data which may be synchronized include planned routes, navigation history, favorite destinations, saved routes, trip logs, contacts, calendar information and other data. In some embodiments, the favorite destinations may simply be geographic coordinates which are assigned metadata such as a name, notes, and other data. These data may be retrieved from other profiles stored by the application as well as other mobile-device applications, such as a contact or a personal information management application.

Figure 4:
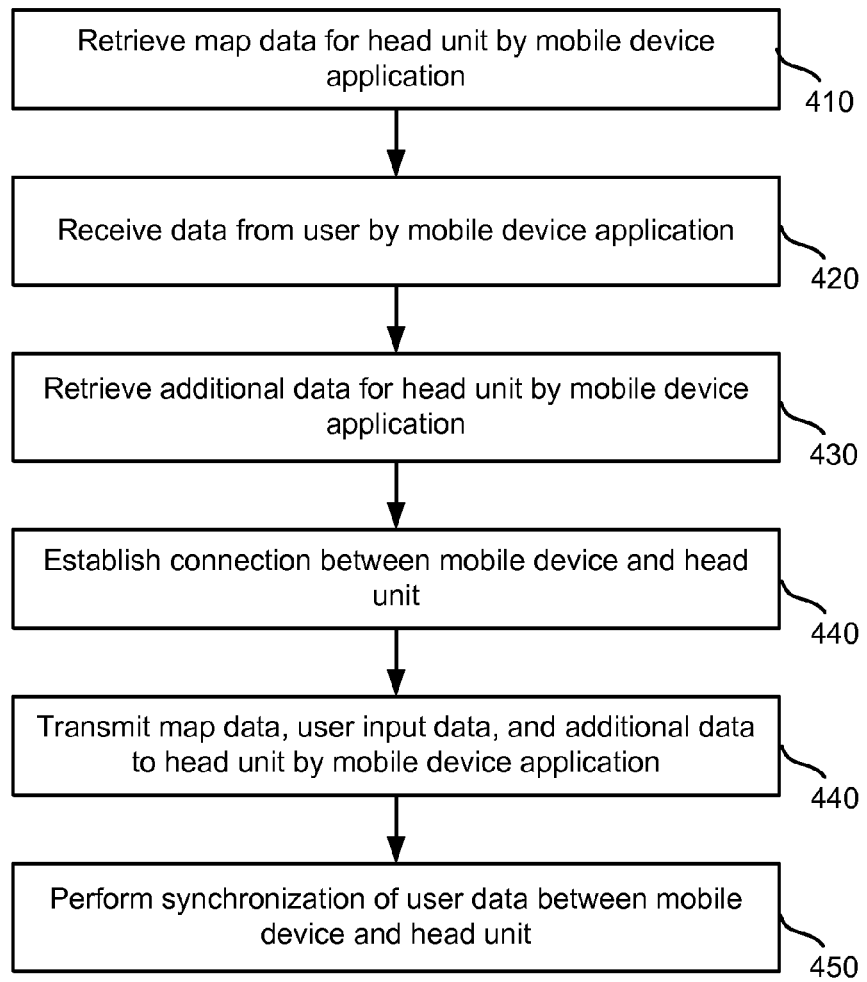
FIG. 4 is a method of operation for a mobile unit in communication with a head unit.

FIG. 4 is a method of operation for a mobile unit in communication with a head unit. Map data may be retrieved for the head unit by the mobile-device application at step 410. The map data may be retrieved any time the mobile device is within range of a network providing the map data, such as a cellular network, Wi-Fi network or other data communication network. In some embodiments, the mobile application may receive a notification that new map data is ready for download. The mobile application may download the map data at a time that is convenient for the mobile device user. Map data may be retrieved for the head unit whether the user is in the vicinity of the head unit or not.

Data may be received by a mobile-device application from the user at step 420. The user may provide input, share settings information, planned routes and other data into the mobile-device unit at any time. Additional data for the head unit may be retrieved by the mobile-device application at step 430. The additional data may include premium features, travel information, restaurant reviews, and other data retrieved by the mobile-device application. A connection is then established between the mobile device and the head unit at step 440. This connection may be established, for example, the next time the user is in the vicinity of the vehicle head unit. The map data, user input data and other data may be transmitted to the head unit by the mobile device at step 450. The transmission may be through a wireless or wired connection between the mobile device and the head unit.

A synchronization of user data may also be performed between the mobile device and head unit at step 460. The synchronization may be performed automatically or upon user input, based on user settings which may control the synchronization. The user settings may also indicate if the synchronization is a one-way synchronization, two-way synchronization, and what user data and other data to synchronize.

Figure 5:
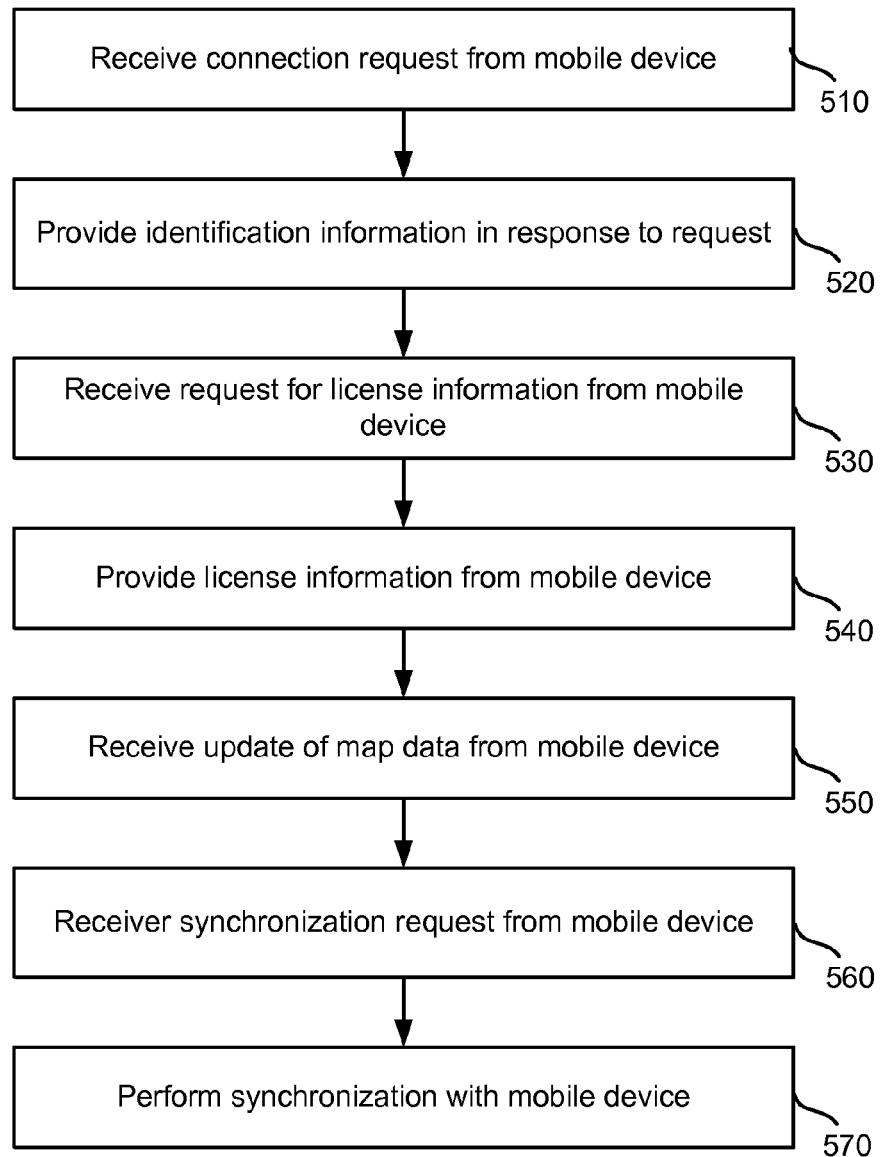
FIG. 5 is a method of operation for a head unit.

FIG. 5 is a method of operation for a head unit. A connection request is received from a mobile device at step 510. Upon receiving the request, the head unit may provide a response to the connection request and provide information to the mobile device. For example, head unit identification information may be provided in response to the request at step 520. The identification information may include the head unit identifier and any other information required to establish a connection.

The head unit may receive a request for license information from the mobile device at step 530. Upon receiving the request, the head unit may provide license information to the mobile device at step 540. The license information may include details of the license including a type, duration, features, and other data. In some embodiments, a code may be transmitted which represents the license features from the head unit to the mobile device.

An update of map data may be received by the head unit from the mobile device at 550. The map data may include map data, user input and additional data collected by the mobile device since the last connection between the mobile device and the head unit. A synchronization request may be received from the mobile device by the head unit at step 560. The synchronization may be performed with the mobile device at step 570. In some embodiments, the synchronization request may be denied based on resources of the head unit. For example, if the head unit is busy processing a navigation route and resources are being used, the synchronization request may be denied till a later date.

The mobile application may communicate with remote networks and the head unit to provide additional services to a user of the navigation system. For example, the mobile application may provide network based features such as online weather, fuel prices, speed camera information, local searches, and so forth. These features may be provided as individual service subscriptions which may be managed by the user.

The mobile application may also provide vehicle relationship management features. The vehicle related features may include annual maintenance notifications, authorized service finder, remote diagnostics and calling service center information. The mobile application may also provide marketing and consumer engagement content to a user based on the geographic location of the mobile device.

The mobile application may provide a "parked car finder" service in which directions to the last known location of a vehicle may be provided by the mobile application through the mobile device.

Figure 6:
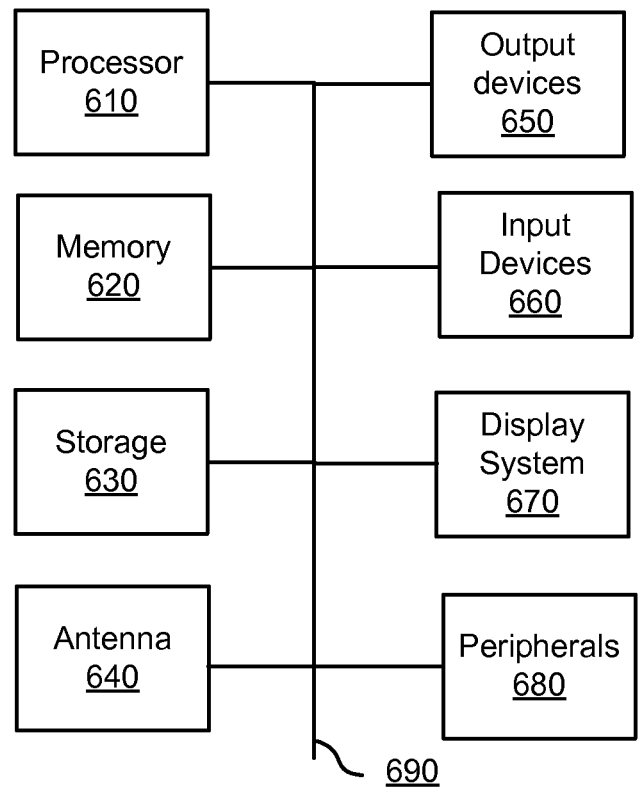
FIG. 6 is a block diagram of a computing device.

FIG. 6 is a block diagram of a device for implementing the present technology. FIG. 6 illustrates an exemplary computing system 600 that may be used to implement a computing device for use with the present technology. System 600 of FIG. 6 may be implemented in the contexts of the likes of head unit 110, application server 150 and data store 160. The computing system 600 of FIG. 6 includes one or more processors 610 and memory 620. Main memory 620 may store, in part, instructions and data for execution by processor 66. Main memory can store the executable code when in operation. The system 600 of FIG. 6 further includes a storage 620, which may include mass storage and portable storage, antenna 640, output devices 650, user input devices 660, a display system 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the storage 630, peripheral device(s) 680 and display system 670 may be connected via one or more input/output (I/O) buses.

Storage device 630, which may include mass storage implemented with a magnetic disk drive or an optical disk drive, may be a non-volatile storage device for storing data and instructions for use by processor unit 66. Storage device 630 can store the system software for implementing embodiments of the present invention for purposes of loading that software into main memory 66.

Portable storage device of storage 630 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device.

Antenna 640 may include one or more antennas for communicating wirelessly with another device. Antenna 616 may be used, for example, to communicate wirelessly via Wi-Fi, Bluetooth, with a cellular network, or with other wireless protocols and systems. The one or more antennas may be controlled by a processor 66, which may include a controller, to transmit and receive wireless signals. For example, processor 66 execute programs stored in memory 612 to control antenna 640 transmit a wireless signal to a cellular network and receive a wireless signal from a cellular network.

The system 600 as shown in FIG. 6 includes output devices 650 and input device 660. Examples of suitable output devices include speakers, printers, network interfaces, and monitors. Input devices 660 may include a touch screen, microphone, accelerometers, a camera, and other device. Input devices 660 may include an alpha-numeric keypad, such as a keyboard, for inputting alpha-numeric and other information, or a pointing device, such as a mouse, a trackball, stylus, or cursor direction keys.

Display system 670 may include a liquid crystal display (LCD), LED display, or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 7:
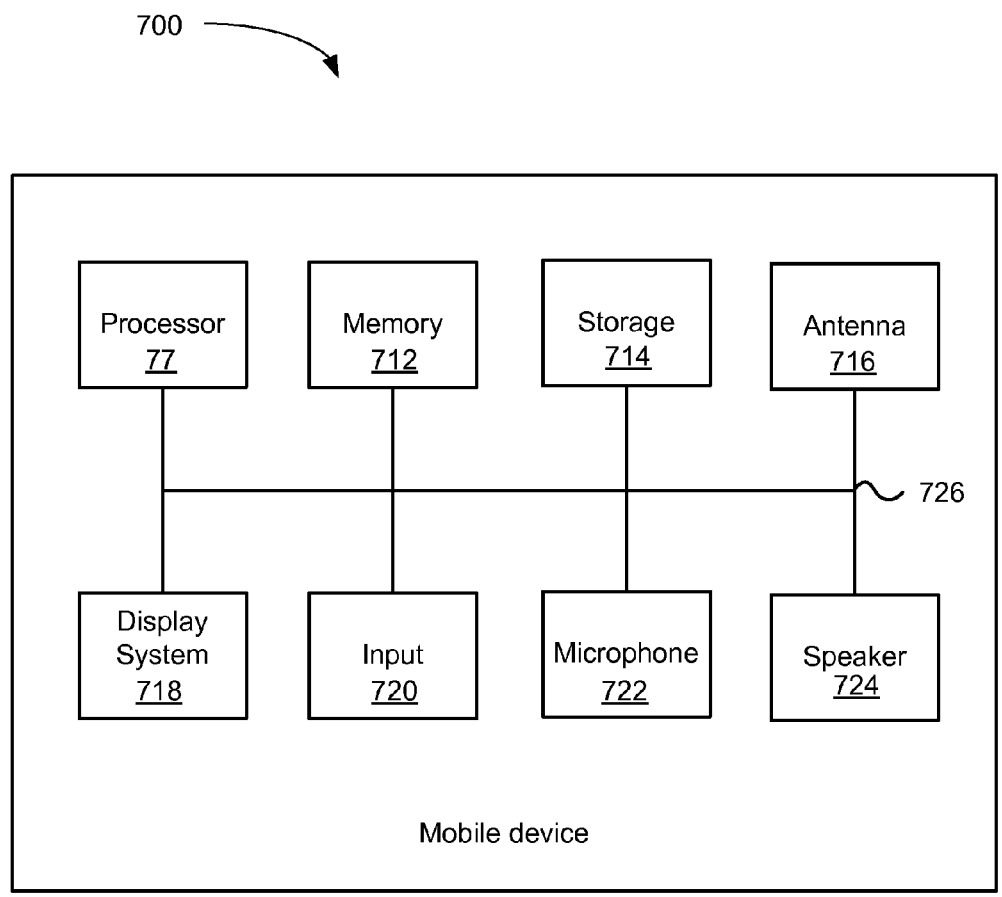
FIG. 7 is a block diagram of a mobile device.

FIG. 7 illustrates an exemplary mobile device system 700 that may be used to implement a mobile device for use with the present technology, such as for mobile device 120. The mobile device 700 of FIG. 7 includes one or more processors 710 and memory 712. Memory 712 stores, in part, programs, instructions and data for execution and processing by processor 710. The system 700 of FIG. 7 further includes storage 714, one or more antennas 716, a display system 718, inputs 720, one or more microphones 722, and one or more speakers 724.

The components shown in FIG. 7 are depicted as being connected via a single bus 726. However, the components 710-724 may be connected through one or more data transport means. For example, processor unit 77 and main memory 712 may be connected via a local microprocessor bus, and storage 714, display system 718, input 720, and microphone 722 and speaker 724 may be connected via one or more input/output (I/O) buses.

Memory 712 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 712 can store the system software for implementing embodiments of the present invention for purposes of loading that software into main memory 710.

Antenna 716 may include one or more antennas for communicating wirelessly with another device. Antenna 716 may be used, for example, to communicate wirelessly via Wi-Fi, Bluetooth, with a cellular network, or with other wireless protocols and systems. The one or more antennas may be controlled by a processor 710, which may include a controller, to transmit and receive wireless signals. For example, processor 710 execute programs stored in memory 712 to control antenna 716 transmit a wireless signal to a cellular network and receive a wireless signal from a cellular network.

Display system 718 may include a liquid crystal display (LCD), a touch screen display, or other suitable display device. Display system 770 may be controlled to display textual and graphical information and output to text and graphics through a display device. When implemented with a touch screen display, the display system may receive input and transmit the input to processor 710 and memory 712.

Input devices 720 provide a portion of a user interface. Input devices 760 may include an alpha-numeric keypad, such as a keyboard, for inputting alpha-numeric and other information, buttons or switches, a trackball, stylus, or cursor direction keys.

Microphone 722 may include one or more microphone devices which transmit captured acoustic signals to processor 710 and memory 712. The acoustic signals may be processed to transmit over a network via antenna 716.

Speaker 724 may provide an audio output for mobile device 700. For example, a signal received at antenna 716 may be processed by a program stored in memory 712 and executed by processor 710. The output of the executed program may be provided to speaker 724 which provides audio. Additionally, processor 710 may generate an audio signal, for example an audible alert, and output the audible alert through speaker 724.

The mobile device system 700 as shown in FIG. 7 may include devices and components in addition to those illustrated in FIG. 7. For example, mobile device system 700 may include an additional network interface such as a universal serial bus (USB) port.

The components contained in the computer system 700 of FIG. 7 are those typically found in mobile device systems that may be suitable for use with embodiments of the present invention and are intended to represent a broad category of such mobile device components that are well known in the art. Thus, the computer system 700 of FIG. 7 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A non-transitory computer readable storage medium having embodied thereon a program, the program being executable by a processor to perform a method for communicating navigation data between a remote server unit and an integrated navigation device located in a vehicle, the method comprising:
   establishing a first communication path between the remote server and a mobile communication device;
   checking the availability of updated navigation data on the remote server;
   when updated navigation data is available on the server, downloading the updated navigation data from the remote server to the mobile communication device;
   establishing a second connection path between the mobile communication device and the integrated navigation device after downloading the updated navigation data is complete; and
   transmitting the updated navigation data from the mobile communication device the integrated navigation device.

2. The non-transitory computer readable storage medium of claim 1, wherein an application is installed on the mobile communication device and received through a network-based application store.

3. The computer readable storage medium of claim 1, the method further comprising receiving map data by the mobile communication device from a remote server.

4. The non-transitory computer readable storage medium of claim 1, the method further comprising transmitting map data through WiFi connection.

5. The non-transitory computer readable storage medium of claim 1, the method further comprising transmitting map data through USB connection.

6. The non-transitory computer readable storage medium of claim 1, the method further comprising:
    receiving data by mobile communication device from network via wireless connection; and
    transmitting received data from mobile communication device to an integrated navigation device.

7. The non-transitory computer readable storage medium of claim 1, wherein map data is transmitted to an integrated navigation device automatically.

8. The non-transitory computer readable storage medium of claim 1, wherein map data is transmitted to an integrated navigation device in response to user input.

9. The non-transitory computer readable storage medium of claim 1, further comprising performing a synchronization of user data between the mobile communication device and the an integrated navigation device.

10. The non-transitory computer readable storage medium of claim 9, wherein the user data includes a favorite geographic location, contact, route, trip log, or navigation history.

11. The non-transitory computer readable storage medium of claim 1, the method further comprising:
    receiving route data by the application on the mobile communication device; and
    transmitting the route data to the integrated navigation device.

12. The non-transitory computer readable storage medium of claim 1, the method further comprising:
    retrieving vehicle data by the application; and
    transmitting the vehicle data to the integrated navigation device.

13. The non-transitory computer readable storage medium of claim 1, the method further comprising:
    detecting by the application that a map is available for the integrated navigation device; and
    providing a notification that the map is available.

14. The non-transitory computer readable storage medium of claim 1, the method further comprising:
    creating a first profile by the application for a first vehicle having the integrated navigation device; and
    creating a second profile by the application for a second vehicle having a second integrated navigation device.

15. The non-transitory computer readable storage medium of claim 1, wherein communicating map data includes receiving map data from the integrated navigation device by the mobile communication device.

16. The non-transitory computer readable storage medium of claim 1, wherein communicating map data includes providing map data by the mobile communication device to the integrated navigation device, the map data retrieved by the mobile communication device from a remote server.

\* \* \* \* \*

UNITED STATES PATENT AND TRADEMARK OFFICE
CERTIFICATE OF CORRECTION

PATENT NO. : 9,031,788 B2
APPLICATION NO. : 14/109752
DATED : May 12, 2015
INVENTOR(S) : Peter Balogh It is certified that error appears in the above-identified patent and that said Letters Patent is hereby corrected as shown below:

In the Claims:

Claim 1, column 8, lines 66-67, "from the mobile communication device the integrated navigation device" should be changed to --from the mobile communication device to the integrated navigation device--.

Signed and Sealed this
Second Day of February, 2016

Michelle K. Lee
*Director of the United States Patent and Trademark Office*